(12) United States Patent
Boyle et al.

(10) Patent No.: US 9,141,605 B2
(45) Date of Patent: *Sep. 22, 2015

(54) ATTRIBUTION USING SEMANTIC ANALYSIS

(71) Applicant: International Business Machines Corporation, Armonk, NY (US)

(72) Inventors: Currie P. Boyle, Burnaby (CA); Homa Javahery, New Westminster (CA); Eniko I. Rozsa, Coquitlam (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/494,791

(22) Filed: Sep. 24, 2014

(65) Prior Publication Data

US 2015/0019209 A1 Jan. 15, 2015

Related U.S. Application Data

(63) Continuation of application No. 13/689,905, filed on Nov. 30, 2012.

(30) Foreign Application Priority Data

Feb. 8, 2012 (CA) ...................................... 2767676

(51) Int. Cl.
*G06F 17/30* (2006.01)
*G06F 17/27* (2006.01)

(52) U.S. Cl.
CPC ...... *G06F 17/2785* (2013.01); *G06F 17/30654* (2013.01); *G06F 17/30657* (2013.01); *G06F 17/30684* (2013.01)

(58) Field of Classification Search
USPC ................................................. 707/705, 739
See application file for complete search history.

(56) References Cited

U.S. PATENT DOCUMENTS 5,778,157 A 7/1998 Oatman et al.
5,794,050 A 8/1998 Dahlgren et al.
(Continued)

FOREIGN PATENT DOCUMENTS

EP 1939797 7/2008
KR 20070113098 11/2007
(Continued)

OTHER PUBLICATIONS

Chuang et al.; Automatic Query Taxonomy Generation for Information Retrieval Applications; Web Knowledge Discovery Lab; Institute of Information Science, Academia Sinica, Taiwan; 2003; 13 pages.
(Continued)

*Primary Examiner* — Kim Nguyen
(74) *Attorney, Agent, or Firm* — Schmeiser, Olsen & Watts, LLP; John Pivnichny

(57) ABSTRACT

A method and system for semantic attribution of a request. Source data statements for the request are received. A selection of a domain for the received source data statements is received. The received source data statements are semantically analyzed, which includes matching elements in the received source data statements to respective one or more entries in an ontology associated with the selected domain. The ontology includes items and relationships that define the selected domain. Each element in the received source data statements is a word or a phrase. The one or more entries are assigned to the matched elements, respectively, to annotate each matched element with a respective annotation consisting of the respective one or more entries. The annotated elements are saved with the respective annotations. The annotations are used to generate a search query for the request.

19 Claims, 9 Drawing Sheets

(56) References Cited

U.S. PATENT DOCUMENTS

| | | | |
|---|---|---|---|
| 5,953,718 A | 9/1999 | Wical | |
| 6,094,652 A | 7/2000 | Faisal | |
| 6,178,416 B1 | 1/2001 | Thompson et al. | |
| 6,363,378 B1 | 3/2002 | Conklin et al. | |
| 6,405,190 B1 | 6/2002 | Conklin | |
| 6,484,155 B1 | 11/2002 | Kiss et al. | |
| 6,487,545 B1 | 11/2002 | Wical | |
| 6,510,406 B1 | 1/2003 | Marchisio | |
| 6,584,470 B2 | 6/2003 | Veale | |
| 6,598,043 B1 | 7/2003 | Baclawski | |
| 6,654,740 B2* | 11/2003 | Tokuda et al. | 707/769 |
| 6,675,159 B1 | 1/2004 | Lin et al. | |
| 6,778,995 B1* | 8/2004 | Gallivan | 707/739 |
| 6,847,966 B1* | 1/2005 | Sommer et al. | 707/739 |
| 6,993,475 B1 | 1/2006 | McConnell et al. | |
| 6,996,575 B2* | 2/2006 | Cox et al. | 707/739 |
| 7,027,974 B1 | 4/2006 | Busch et al. | |
| 7,117,207 B1 | 10/2006 | Kerschberg et al. | |
| 7,155,668 B2* | 12/2006 | Holland et al. | 715/256 |
| 7,225,183 B2 | 5/2007 | Gardner | |
| 7,249,121 B1 | 7/2007 | Bharat et al. | |
| 7,272,183 B2 | 9/2007 | Chowdhury et al. | |
| 7,302,383 B2 | 11/2007 | Valles | |
| 7,310,641 B2 | 12/2007 | Moore et al. | |
| 7,310,642 B2 | 12/2007 | McConnell et al. | |
| 7,328,209 B2 | 2/2008 | Das et al. | |
| 7,349,896 B2 | 3/2008 | Chowdhury et al. | |
| 7,412,440 B2 | 8/2008 | Mori et al. | |
| 7,461,047 B2 | 12/2008 | Masuichi et al. | |
| 7,467,232 B2 | 12/2008 | Fish et al. | |
| 7,467,376 B2* | 12/2008 | Le Metayer et al. | 717/143 |
| 7,512,575 B2 | 3/2009 | Mahesh | |
| 7,512,576 B1 | 3/2009 | Syeda-Mahmood et al. | |
| 7,519,529 B1 | 4/2009 | Horvitz | |
| 7,526,425 B2 | 4/2009 | Marchisio et al. | |
| 7,533,089 B2 | 5/2009 | Pan et al. | |
| 7,539,934 B2 | 5/2009 | Kender et al. | |
| 7,542,969 B1 | 6/2009 | Rappaport et al. | |
| 7,543,232 B2 | 6/2009 | Easton, Jr. et al. | |
| 7,562,069 B1 | 7/2009 | Chowdhury et al. | |
| 7,587,308 B2 | 9/2009 | Kasravi et al. | |
| 7,610,192 B1 | 10/2009 | Jamieson | |
| 7,613,664 B2 | 11/2009 | Riezler et al. | |
| 7,644,052 B1 | 1/2010 | Chang et al. | |
| 7,657,417 B2 | 2/2010 | Adamson et al. | |
| 7,657,546 B2 | 2/2010 | Goodwin et al. | |
| 7,668,825 B2 | 2/2010 | Vogel et al. | |
| 7,685,118 B2 | 3/2010 | Zhang | |
| 7,693,827 B2 | 4/2010 | Zamir et al. | |
| 7,739,104 B2 | 6/2010 | Berkan et al. | |
| 7,739,258 B1 | 6/2010 | Halevy et al. | |
| 7,747,632 B2 | 6/2010 | Korn et al. | |
| 7,778,820 B2 | 8/2010 | Horvitz et al. | |
| 7,822,750 B2* | 10/2010 | Duchon et al. | 707/738 |
| 7,836,083 B2 | 11/2010 | Cipollone | |
| 7,873,640 B2* | 1/2011 | Chang et al. | 707/739 |
| 7,921,099 B2 | 5/2011 | Bierner | |
| 8,078,573 B2 | 12/2011 | Betz | |
| 8,131,757 B2 | 3/2012 | Haley et al. | |
| 8,335,754 B2 | 12/2012 | Dawson et al. | |
| 8,386,335 B1 | 2/2013 | Cohen | |
| 8,386,475 B2* | 2/2013 | Green et al. | 707/722 |
| 8,566,369 B2* | 10/2013 | Rousseau et al. | 707/821 |
| 2003/0217052 A1 | 11/2003 | Rubenczyk et al. | |
| 2004/0010491 A1 | 1/2004 | Riedinger | |
| 2004/0111465 A1 | 6/2004 | Chuang et al. | |
| 2005/0131695 A1 | 6/2005 | Lucente et al. | |
| 2005/0138018 A1 | 6/2005 | Sakai et al. | |
| 2005/0256819 A1 | 11/2005 | Tibbs et al. | |
| 2005/0267871 A1 | 12/2005 | Marchisio et al. | |
| 2006/0047632 A1 | 3/2006 | Zhang | |
| 2006/0224580 A1 | 10/2006 | Quiroga et al. | |
| 2008/0071772 A1 | 3/2008 | Rosenoff et al. | |
| 2009/0077047 A1 | 3/2009 | Cooper et al. | |
| 2009/0089270 A1 | 4/2009 | Haley et al. | |
| 2009/0228777 A1 | 9/2009 | Henry et al. | |
| 2009/0254510 A1 | 10/2009 | Omoigui | |
| 2010/0070448 A1 | 3/2010 | Omoigui | |
| 2012/0030228 A1 | 2/2012 | Naidu et al. | |
| 2013/0204877 A1 | 8/2013 | Boyle et al. | |
| 2013/0290366 A1 | 10/2013 | Boyle et al. | |

FOREIGN PATENT DOCUMENTS

| | | |
|---|---|---|
| KR | 100980579 | 9/2010 |
| WO | 0210980 | 2/2002 |
| WO | WO2005062202 | 7/2005 |
| WO | 2007059287 | 5/2007 |
| WO | 2010017159 | 2/2010 |

OTHER PUBLICATIONS

Chu et al.; Semantic Association of Taxonomy-based Standards Using Ontology; Computer and Information Sciende and Engineering, University of Florida, Gainesville, FL, USA; 2005; 7 pages.

Ruotsalo, Tuukka; Methods and Applications for Ontology-Based Recommender Systems, Doctoral Dissertation; Aalto University, School of Science and Technology, Faculty of Information and Natural Sciences, Department of Media Technology, Espoo, Finland; Jun. 7, 2010; 96 pages.

Karat et al.; SPARCLE Policy Management Workbench; IBM Research [retrieved on Jan. 12, 2012]; retrieved from the Internet: <URL: http://www.domino.research.ibm.com/comm/research_projects.nsf/pages/sparcle . . . >; 7 pages.

Rozsa, Eniko; 1-2-3 Portal Workflow Assistant Rel1—Requirements Review; 2009 IBM Corporation; 15 pages.

Havahery et al.; CSA Support 2.0, 1-2-3 Portal Workflow Assistant, High Level Ontology Design Document; IBM Centres for Solution Innovation; Vancouver; 2010; 35 pages.

U.S. Appl. No. 13/459,298, filed Apr. 30, 2012, Confirmation No. 3079.

U.S. Appl. No. 13/459,310, filed Apr. 30, 2012, Confirmation No. 7339.

Office Action (Mail date Mar. 14, 2014) for U.S. Appl. No. 13/459,298, filed Apr. 30, 2012, Conf. No. 3079.

Final Office Action (Mail date Mar. 13, 2014) for U.S. Appl. No. 13/459,310, filed Apr. 30, 2012, Conf. No. 7339.

Final Response (filed May 9, 2014) for U.S. Appl. No. 13/459,298, filed Apr. 30, 2012, Conf. No. 3079.

Final Response (filed May 9, 2014) for U.S. Appl. No. 13/459,310, filed Apr. 30, 2012, Conf. No. 7339.

Notice of Appeal (filed Jun. 16, 2014) for U.S. Appl. No. 13/459,298, filed Apr. 30, 2012, Conf. No. 3079.

Notice of Appeal (filed Jun. 16, 2014) for U.S. Appl. No. 13/459,310, filed Apr. 30, 2012, Conf. No. 7339.

Appeal Brief (filed Aug. 13, 2014) for U.S. Appl. No. 13/459,310, filed Apr. 30, 2012, Conf. No. 7339.

Appeal Brief (filed Aug. 14, 2014) for U.S. Appl. No. 13/459,298, filed Apr. 30, 2012, Conf. No. 3079.

Damljanovic et al., Natural Language to Ontologies: Combining Syntactic Analysis and Ontology-Based Lookup through the User Interaction, ESWC 2010, Part I, LNCS 6088, pp. 106-120, copyright Springer-Verlag Berlin Heidelberg.

International Search Report, PCT, 4 pages, International application No. PCT/CA2012/050321, International Filing Date May 17, 2012.

Office Action Mail Date Oct. 3, 2013 for U.S. Appl. No. 13/459,298, filed Apr. 30, 2012, First Named Inventor Currie P. Boyle, Confirmation No. 3079.

Office Action Mail Date Oct. 3, 2013 for U.S. Appl. No. 13/459,310, filed Apr. 30, 2012, First Named Inventor Currie P. Boyle, Confirmation No. 7339.

Notice of Allowance (Aug. 8, 2014) for U.S. Appl. No. 13/689,905, filed Nov. 30, 2012, Conf. No. 3972.

Amendment (Jun. 11, 2014) for U.S. Appl. No. 13/689,905, filed Nov. 30, 2012, Conf. No. 3972.

Office Action (Mar. 12, 2014) for U.S. Appl. No. 13/689,905, filed Nov. 30, 2012, Conf. No. 3972.

(56) References Cited

OTHER PUBLICATIONS

Notice of Allowance (Nov. 5, 2014) for U.S. Appl. No. 13/689,905, filed Nov. 30, 2012, Conf. No. 3972.

Reply Brief (filed Jan. 20, 2015) for U.S. Appl. No. 13/459,298, filed Apr. 30, 2012, Conf. No. 3079.

Reply Brief (filed Jan. 20, 2015) for U.S. Appl. No. 13/459,310, filed Apr. 30, 2012, Conf. No. 7339.

European Patent Search Report, Application No. 13 746 495.4, dated Jan. 23, 2015, 7 pages.

\* cited by examiner

Annotation system 300

| Source data | Query logic behavior |
|---|---|
| Pillar information | |
| Express activity – what changed | Actions attributed to what the user was doing at the time of the problem |
| Express product and environment – what are main products of concern | Products within the domain of interest to which an action can be applied |
| Express situation – what symptoms are associated with the situation | Symptoms leading to a user problem |
| Express component – where does the situation occur relative to which component | Components within the domain of interest related to where a situation occurs |
| Supporting ontology concepts | |
| Detect power action words | Action words but not considered activities |
| Detect trash action words | Action words identifies as not wanted |
| Detect domain terms | Nouns which define a domain |
| Detect states | Modifiers which provide additional information |
| Detect trash situation words | Generic situation words typically discarded |
| Remaining useful words | Important standard words relevant to a domain |
| Advanced concept details | |
| Acronyms | Confirm and Replace by a concept |
| Synonyms | Confirm and Replace by a concept |

~~We've been~~ paying ~~our~~ premiums every month ~~and~~ pretty much every single claim    504 con  con   act   con   dt      st   dt   con sew sew   st    dt   prod 518           520
                                                                                506
~~gets~~ denied (emergency room  visit ~~due~~ to asthma  —  ~~they~~ paid nothing. Cancer
                                                                                508
con    st        dt          act con con sit    con con act   sew      sit 510
surgery — ~~they~~ paid nothing). Why ~~am~~ I paying them every month since ~~they~~ act   con con act  sew    sew con con act   sew   st    dt   sew  con      512

514
don't ~~seem to~~ cover anything?

neg  con con act   sew        516

My husband purchased a life insurance policy from XYZ Insurance Company  602
                                                                         604
con   dt          act           prod/phrase      con  dt/acr   dt/phrase   630
                                           626            628
He passed away on 09/06/2009. A claim was filed on 09/12/2009. XYZ Life sent  606
                                                                    632    608 con sit/proximity con     ruw     con prod con  act con    ruw    dt/syn/partial  act
                                                                                   610
me  a  letter stating that since the policy was less than 2 years old they were 612
con con  st    sew     con sew con  prod  con    st/phrase    ruw  con con
                                                                            614
conducting a routine inquiry requesting hospital and doctor's records
                                                              634        616
  act    con  dt     act    paw      dt  con  dt/prox  dt/prox
                                                                        618
I think they feel he wasn't in good health when the policy was purchased
                                                                        620
con con con act con neg    st    dt    con con prod  con   act              622

I feel that XYZ Life  is stalling looking for  a reason not to  pay      this claim.

con taw con  dt/partial con paw   tsw    con con   dt   neg con act/antonym con prod
                                                                                624

FIG. 6

ATTRIBUTION USING SEMANTIC ANALYSIS

This application is a continuation application claiming priority to Ser. No. 13/689,905, filed Nov. 30, 2012.

TECHNICAL FIELD

This disclosure relates generally to self-service applications in a data processing system and more specifically to semantic attribution of an inbound request for use in the self-service (such as self guided-product/service selection or self guided support) applications in the data processing system.

BACKGROUND

Typical self-service applications use formal categories to describe a domain in question. Examples of domains with known formal categories range from home furnishing to healthcare yet each domain is well described. Organizational adoption of these formal categories presume them to be well known to the consumers or patients therefore accordingly easily interpreted by the end users of the applications. Formal categories typically have category definitions strongly defined on underlying back-end systems. However, most users would rather explain associated real world needs or problems or healthcare concerns in respective terms, in free-form text, which may not align with the formal descriptions or categories provided.

Therefore, there are often attempts to map the real world needs and the formal categorization in order to bridge knowledge gap. For example within the field of information technology, operations including understanding and mapping techniques of a domain may be performed to ease the human computer interface. The validation process typically checks heuristics, to determine whether a system matches the real world. Even since, the validation check quite often fails when user interface terminology reflecting system-centric terms does not match the real world terminology and categorization of the users of the system.

There is nothing simple about operations including understanding queries or inputs of a user, responding with rich and appropriate computer generated responses, and then upon completion of a dialog, returning programmatically located valid knowledge or resources to the user in a response. User is not a term restricted to a human user but also can be another computing component including a software application or device.

BRIEF SUMMARY

The present invention provides a method for semantic attribution of a request, said method implemented by a processor of a computer system, said method comprising:

said processor receiving source data statements for the request;

said processor receiving a selection of a domain for the received source data statements;

said processor semantically analyzing the received source data statements, said semantically analyzing comprising matching elements in the received source data statements to respective one or more entries in an ontology associated with the selected domain, wherein the ontology comprises items and relationships that define the selected domain, and wherein each element in the received source data statements is a word or a phrase;

said processor assigning the one or more entries to the matched elements, respectively, to annotate each matched element with a respective annotation consisting of the respective one or more entries; and said processor saving the annotated elements with the respective annotations.

The present invention provides a computer program product, comprising a computer readable storage device having a computer readable program code stored therein, said program code configured to be executed by a processor of a computer system to implement a method for semantic attribution of an inbound request, said method comprising:

said processor receiving source data statements for the request;

said processor receiving a selection of a domain for the received source data statements;

said processor semantically analyzing the received source data statements, said semantically analyzing comprising matching elements in the received source data statements with respective one or more entries in an ontology associated with the selected domain, wherein the ontology comprises items and relationships that define the selected domain, and wherein each element in the received source data statements is a word or a phrase;

said processor assigning the one or more entries to the matched elements, respectively, to annotate each matched element with a respective annotation consisting of the respective one or more entries; and said processor saving the annotated elements with the respective annotations.

The present invention provides a computer system comprising a processor, a memory coupled to the processor, and a computer readable storage device coupled to the processor, said storage device containing program code configured to be executed by the processor via the memory to implement a method for semantic attribution of an inbound request, said method comprising:

said processor receiving source data statements for the request;

said processor receiving a selection of a domain for the received source data statements;

said processor semantically analyzing the received source data statements, said semantically analyzing comprising matching elements in the received source data statements with respective one or more entries in an ontology associated with the selected domain, wherein the ontology comprises items and relationships that define the selected domain, and wherein each element in the received source data statements is a word or a phrase;

said processor assigning the one or more entries to the matched elements, respectively, to annotate each matched element with a respective annotation consisting of the respective one or more entries; and said processor saving the annotated elements with the respective annotations.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

FIG. 4 is a tabular representation of categorization within an ontology used with the annotation system of FIG. 3, operable for various embodiments of the disclosure;

FIG. 5 is a textual representation of an annotation using the system of FIG. 3 operable for various embodiments of the disclosure;

FIG. 6 is a textual representation of an annotation using the system of FIG. 3 operable for various embodiments of the disclosure;

DETAILED DESCRIPTION

Figure 1:
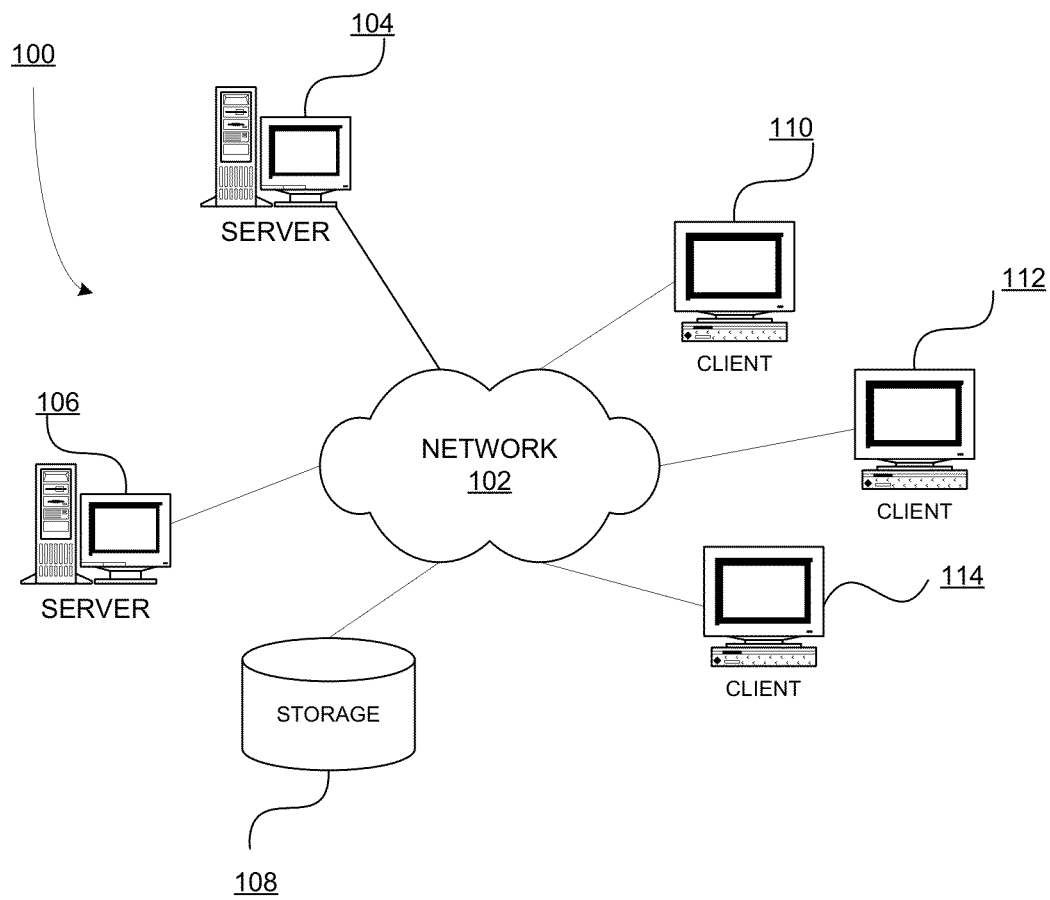
FIG. 1 is a block diagram of an exemplary network data processing system operable for various embodiments of the disclosure.

According to one embodiment, a computer-implemented process for semantic attribution of an inbound request, receives source data statements, selects a domain for the received source data statements and semantically analyzes elements in the received source data statements using an ontology associated with the selected domain. The computer-implemented process further determines whether a match is identified between an element and a corresponding entry in the ontology and responsive to a determination that the match is identified between the element and the corresponding entry in the ontology, assigns matching entries to respective identified elements to form annotated elements and saves the annotated elements with respective annotations.

According to another embodiment, a computer program product for semantic attribution of an inbound request comprises a computer recordable-type media containing computer executable program code stored thereon. The computer executable program code comprises computer executable program code for receiving source data statements, computer executable program code for selecting a domain for the received source data statements, computer executable program code for semantically analyzing elements in the received source data statements using an ontology (or more simply, an extended taxonomy might be used if appropriate) associated with the selected domain, computer executable program code for determining whether a match is identified between an element and a corresponding entry in the ontology, computer executable program code responsive to a determination that the match is identified between the element and the corresponding entry in the ontology, for assigning matching entries to respective identified elements to form annotated elements and computer executable program code for saving the annotated elements with respective annotations.

According to another embodiment, an apparatus for semantic attribution of an inbound request comprises a communications fabric, a memory connected to the communications fabric, wherein the memory contains computer executable program code, a communications unit connected to the communications fabric, an input/output unit connected to the communications fabric, a display connected to the communications fabric and a processor unit connected to the communications fabric. The processor unit executes the computer executable program code to direct the apparatus to receive source data statements, select a domain for the received source data statements and semantically analyze elements in the received source data statements using an ontology associated with the selected domain. The processor unit executes the computer executable program code to further direct the apparatus to determine whether a match is identified between an element and a corresponding entry in the ontology and responsive to a determination that the match is identified between the element and the corresponding entry in the ontology, assign matching entries to respective identified elements to form annotated elements and save the annotated elements with respective annotations.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) or device(s) having computer readable program code embodied thereon. The program code may be configured to be executed by one or more processors of a computer or computer system via a memory to implement the methods of the present invention.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
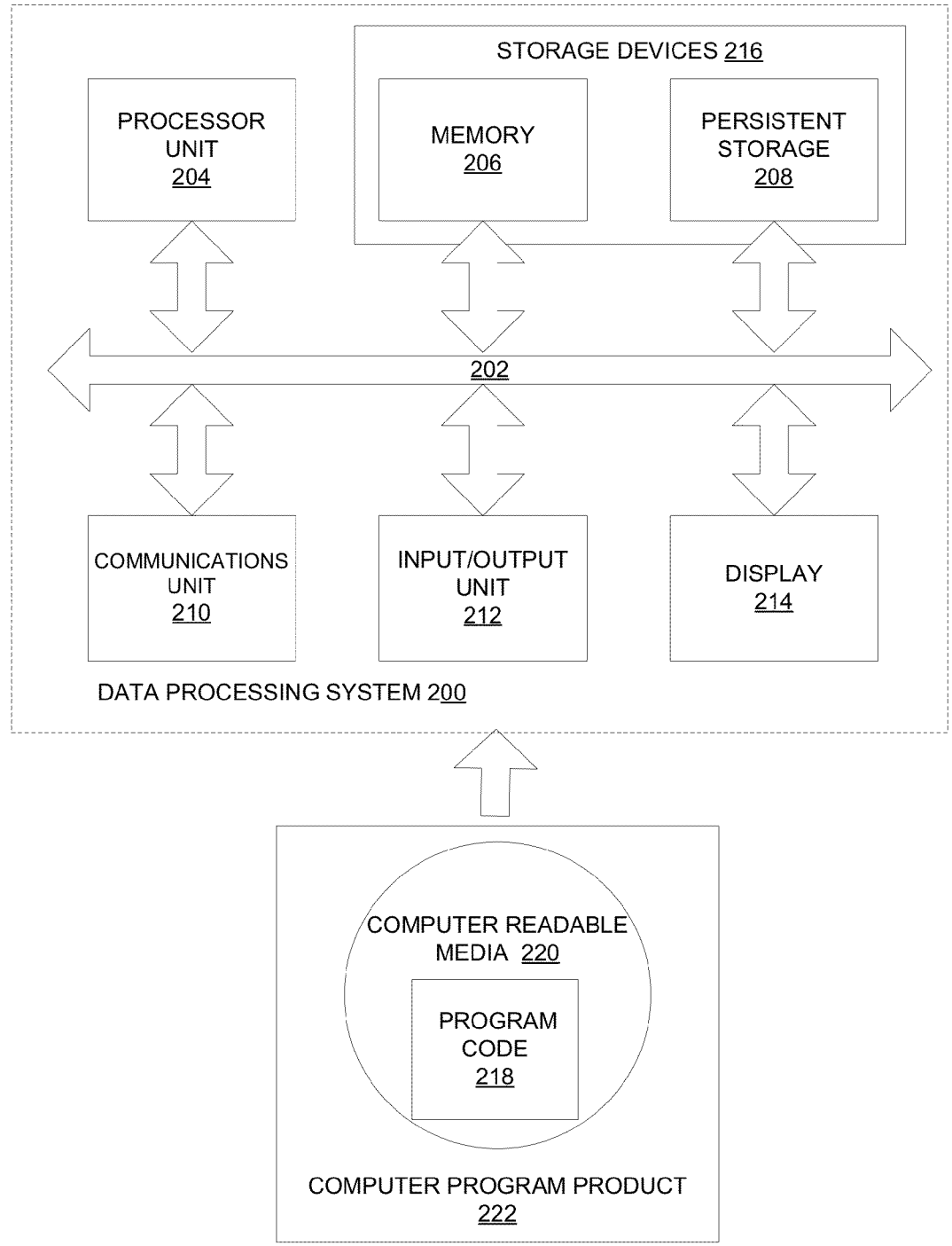
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables. The data processing system 100 comprises one or more computer systems.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for semantic attribution of an inbound request is presented. Processor unit 204 receives source data statements through communications unit 210, input/output unit 212, or storage devices 216, selects a domain for the received source data statements and semantically analyzes elements in the received source data statements using an ontology associated with the selected domain maintained in storage devices 216. Processor unit 204 further determines whether a match is identified between an element and a corresponding entry in the ontology and responsive to a determination that the match is identified between the element and the corresponding entry in the ontology, assigns matching entries to respective identified elements and saves annotated elements with respective annotations in storage devices 216.

Figure 3:
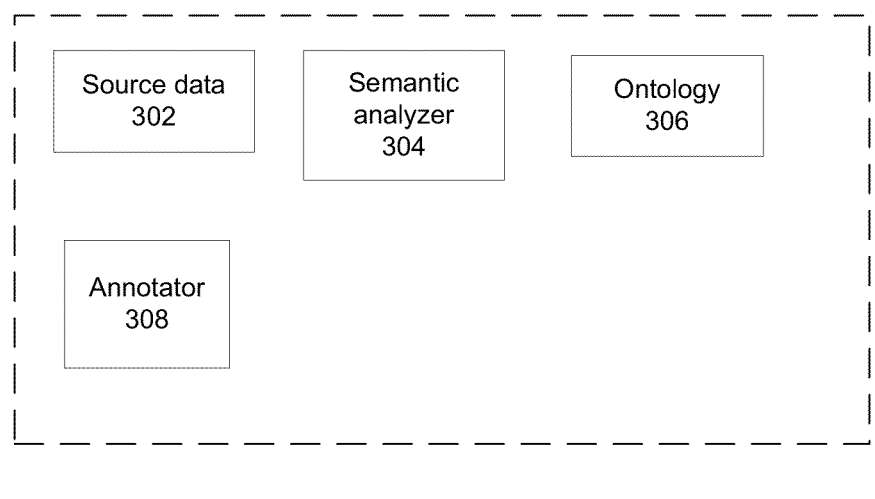
FIG. 3 is a block diagram of an annotation system operable for various embodiments of the disclosure.

With reference to FIG. 3 a block diagram of an annotation system operable for various embodiments of the disclosure is presented Annotation system 300 is an example embodiment of an attribution process by application of semantic analysis of source data to create clustered relationships based upon an inbound and unstructured request provided by a user.

Annotation system 300 in the example embodiment leverages support of an underlying system such as network data processing system 100 of FIG. 1 or data processing system 200 of FIG. 2 for typical process support including communication, storage, presentation and processing. Annotation system 300 comprises a number of components including source data 302, semantic analyzer 304, ontology 306 and annotator 308. A lexical analyzer and syntactic analyzer may also be included as a portion of natural language processing to pre-process source data 302 when well-formed sentence structures are in source data 302. Well-formed sentence structures refer to a composition of elements in which is found an expected placement and relation of words according to grammar rules of a language. The disclosed process of annotation system 300 steps through a set of words or terms to attribute and process a client interaction using ontology structures. The annotation process may be used iteratively as a portion of a user dialog process to enable interactive refinement of the input data of the user.

Source data 302 is representative of inbound and unstructured request information provided to annotation system 300 by a user typically using a user interface, for example when in a dialog with a human user of display 214 of data processing system 200 of FIG. 2. Source data 302 may also be provided using communication unit 210, input/output unit 212 or storage devices 216 all of data processing system 200 of FIG. 2.

Semantic analyzer 304 provides a capability to parse the user query statements to identify relevant terms. Semantic analyzer 304 uses information contained in an associated ontology to categorize and prioritize terms identified in the user query statements of source data 302 in accordance with relevance to ontology concepts of ontology 306.

Semantic analyzer 304 traverses the input provided as source data 302 from beginning to end until all words or terms in the input have been effectively processed. Analysis may comprise one or more passes through the data input to assess, phrase and align the content of the input.

Ontology 306 provides a capability to specifically organize information. The ontology (or extended taxonomy model) includes placement of things, including words, into categories and relating these categories with each other using a variety of relationship types. Ontology is accordingly a model, which may be used to provide definitions of things using a standard set of symbols for an industry, domain, or an enterprise. For example, within an information technology ontology could include but is not limited to a glossary, data dictionary and, a data model. The scope of items and associated relationships in the ontology defines a domain.

Embodiments of the disclosed process of annotation system 300 provide a capability of an attribution process, by application of the semantic analysis creates clustered relationships based upon an inbound unstructured request instead of a common semantic practice of parsing the request against an existing model. The attribution process of annotation system 300 typically enables significantly more accurate information because the process better simulates human heuristic techniques. The disclosed process of annotation system 300 further provides a means to type attribute inbound requests in a fashion that better enables for example user self-service applications, in a fashion that predicates a need to pre-populate an ontology or fulfill decisioning using a preconfigured per use case (such as rule based) decision tree. An embodiment of annotation system 300 further provides capabilities typically including reducing operational overhead and increasing customer satisfaction.

While the existence of ontologies are now more commonly understood, the use of ontologies to model the needs of a user, for example, question, objective, requirement, and other needs rather than using the ontology to model available information sources is new. Modeling the needs of the user drives working interactively with a client to refine the query or request of the user. Modeling the available information attempts to classify existing knowledge bases, processes, tools, and systems. Embodiments of annotation system 300 provide a capability for attribution of source data by processing of one or more ontology structures enabling interactive refinement such as in a query or prediction method.

While the statements above are simple to say, the complexity of working interactively with the user requires that any computer system have methods to deeply comprehend information comprising the queries or inputs of the user and a capability of mapping that information into specific domains of interest. There is nothing simple about understanding queries or inputs of the user and responding with rich and appropriate computer generated responses, and then at upon completion return programmatically identified valid knowledge or resources.

Source data 302 is representative of inbound, often unstructured requests from a user as a portion of a dialog with annotation system 300. Consider for example, intelligently understanding users statements as one view of requirement for annotation system 300 to process. Organizations typically want to resolve these types of statements online rather than using a typically scarce and costly resource in the form of a client representative, a call center representative or an interactive chat host.

In a first case of intelligently understanding user statements of source data 302, using one example, a user obtains a credit card from bank Y. Statements using this example are as follows: They have the worst customer service I have ever dealt with! My situations are very similar to the others posted on this website and it should be looked into! First off one day when I got online to check my statement, I had a late fee of 39 dollars, but I have never received my statement in the mail.

In another example, statements of source data 302 are associated using a stock brokerage as in: My trading firm Z has successfully lost ALL of my research and trading information for the fourth time in eight months. After the first three times, I spoke to their technicians and they blamed my computer. In addition to those problems, trading firm Z continually jumps off line at crucial times during trading. This results in monetary losses due to trades not going through in time to avoid losses or maximizing gains. Timing is everything in day trading.

In another example, statements of source data 302 associated with a network provider scenario include: I called cable provider M and the salesman talked me into signing up for a telecommunications bundle. He told me that there might be a $150 deposit, depending on my credit. He called later that day and said that the deposit was taken off because my credit was checked and was good enough. I thought all was well until I received my first bill with an extra $150 tacked on (which, according to the automated system, was overdue).

Mapping information from source data 302 into specific domains of interest requires annotation system 300 to intelligently interpret and recommend, essentially inferring client needs, using the information analyzed by semantic analyzer 304 using ontology 306. For example, when performing the telecommunications product bundling a recommendation for appropriate bundles is required. Marketing teams typically assemble bundles. Bundle composition activity includes determining whether appropriate user personas have been identified and whether the identified personas are flexible enough. A further determination requires defining the right bundle for a client as well as identifying what is valuable to the client and how to best communicate features of the bundles to the client.

In another example, users wish to describe products or services in their own way rather than being forced into a structure a retailer demands. A user may describe a purchase requirement as buy a non-leather chair that has height and tilt capabilities with removable arms and adjustable lumbar that will primarily be used for computer work with a keyboard tray. An embodiment of annotation system 300 provides a capability to segment and annotate each aspect of the client requirements enabling another process to map the processed requirements to the products of the retailer.

In yet another example, using predictive client servicing, an ability to identify what a user wants before the user can well define a desirable feature is an asset. Typical assist-systems can only partially help users locate an object when they are not sure how to find the object. A next level of locating assistance is helping the user find something when the user is not sure of a need and that requires a guided-selling or guided-support system to have functions provided by annotation system 300 that can deeply annotate the needs of the user.

In a similar example using customer retention management, when a determination is made to drive promotions to retain a client as a customer of an organization, it is necessary to identify what offers are most needed to retain the user given a history of the user and by profiling the user. For example, product bundling identifies services and products that create a specifically appropriate value proposition to grow an organization's wallet share of a client. In contrast, retention focuses on clients leaving a current supplier and identifying critical save attributes for the client (so the client continues to be a client). Information learned and inferred about a set of clients is then analyzed for use with other similar clients.

In an example of assessing customer performance (segmenting the importance of a client to an organization), identification of which clients to grow, to maintain or to remove is necessary. Clients typically assess suppliers but suppliers also need to constantly reassess respective clients. The value of a client has a life cycle in a similar aspect as a product. Identification of information used to assess whether a client is becoming a rising star (and a more valued client) or a falling star (accordingly less valued) is important. Again, information inferred from other clients may be useful and applicable to a specific client. The use of techniques in an embodiment of annotation system 300 allow organizations to include in a respective assessment both structured analytic data as well as unstructured (for example, text information) that can be annotated and therefore identified and mapped to value attributes and weighed as part of an overall assessment.

In an example using enhanced claims submission automation, an intelligent interpretation technique of annotation system 300 may be used to provide an element of an automated claim submission and response system that typically reduces manual processing, improves turnaround time, and increases client satisfaction. Intelligent interpretation using annotation system 300 may identify new information to derive new insight. Identifying new information determines what inferences can be made to simplify the client's claim experience and whether inferencing has a potential to help an organization deal with the client more effectively. In view of both sides of the business process, annotation system 300 may be used to identify what can be done to ease the submission (for the client) and processing (for the supplier).

User is often used throughout the disclosure in reference to a human user or a computing device or software application or combination thereof. That is, one computer could be interacting with another computer to obtain advice, for example, including using problem determination, or a recommended action in a workflow. Therefore a user should be considered more broadly then a human.

Parsing natural language statements requires an attribution system to comprehend nuances associated with the intent of a user. To accomplish this the attribution system needs to understand the semantic meaning of statements from the user. Understanding the richness of an extended meaning of user words and phrases enables deeper comprehension by the system. Again the term user does not necessarily mean a human but could be another computing entity.

For example, to effectively understand the content of source data 302, semantic analyzer 304 of attribution system 300 attempts to effectively process every word and corresponding relationship to the domain of interest. In effectively inferring meaning from the supplied input data, semantic analyzer 304 further processes every phrase rather than each word as a stand-alone unit as well as negation of a word or phrase and partial matching of words in phrase. Synonyms and acronyms are considered as well in the analysis of a word.

Semantic analyzer 304 intelligently interprets a state of a word or phrase in an input statement and a respective antonym of that state. Connector words and phrases are taken into consideration as are words considered throwaway words and phrases. The value of a connector word such as and is highly context dependant. In some phrases the connector must be kept and in other cases dropped. Words and phrases that are too vague to be actionable define intent but are not specific enough to derive specific intent. The system must retain and intelligently refine these words and phrases. As well, matching of critical user words or phrases that are specifically domain relevant must be identified and annotated.

Proximity implications of words and phrases to other words and phrases are also considered during the analysis phase. The concept of remaining useful words exists to address words or phrases that should be retained as part of the user statement to aid in subsequent processing because the specific words and phrases add context but do not require further refinement. As well, defining and managing a specific order of the words and phrases to optimize end usage may also be operations employed during semantic analysis.

Semantic analyzer 304 may be tuned to effectively process input data of the user statements according to a support level of the accompanying ontology. For example, when an accompanying ontology is a sparsely populated ontology an associated semantic analysis would not be performed at as deep a level or as thorough as when the ontology was more comprehensively populated because the lack of detail in the semantic structures of the sparsely populated ontology prevents a more comprehensive semantic analysis.

Annotator 308 provides a capability to associate identified attributes derived from ontology 306 during semantic analysis with an analyzed word, term or phrase. For example, an input statement is parsed and analyzed using an internal representation of a string of tokens. Annotator 308 writes one or more attributes in association with a respective word, term or phrase of the input statement as a result of the semantic analysis. A physical or logical combination of the input statement and associated annotations is then available for other processes, such as query service or an intelligent query refinement system.

With reference to FIG. 4 a tabular sample representation of categorization within an ontology used with the annotation system of FIG. 3 operable for various embodiments of the disclosure is presented. Table 400 is an example of a set of classification samples for the processing, however the categorization presented is not limited to this specific categorization, but rather is provided as a concrete example of one implementation.

Semantic analysis analyzes words and terms received as elements in a statement or set of statements from a user and classifies the elements into a set of pillars or concepts, supporting concepts and advanced concept details including situations, activities, products, component, domain terms and other types of elements. An annotation is associated with each specific respective classification, for example, situations (sit), activities (act), products (prod), component (comp), and domain terms (dt) from the previously stated set of concepts, supporting concepts and advanced concept details.

Concepts are terms that are the fundamental building blocks of an annotation system. A concept will vary by domain, but, for example, any term recognized in the previous set of classifications would be treated as a concept, that is a key term.

In a first row of table 400 source data 402 indicates the following content is representative of information received as input from a user. Query logic behavior 404 represents possible interaction of a respective portion of the process with a requesting client user.

Pillar information 406 represents main structural elements of an ontology, containing essential concept underpinnings. The categories of classification are referred to as pillars. There will be one or more pillars. In this IT support example there are four pillars but each domain may have a different required number of pillar elements. Pillar 408 expresses an activity and refers to what changed. For example, an activity is determined by addressing a hypothetical question of what was the user doing that attributed to a change from business as usual, for example, an activity that drove the change from steady state. Descriptor 410 for the activity pillar of pillar 408 describes user actions, and therefore has a relatively flat structure without a hierarchy. As a required source of information, query logic behavior 404 strives for completeness in this pillar. In completeness these actions can be grouped into categories, depending on qualifying information. As well there is specificity, which implies determining whether additional specific information is required. For example pillar completeness might determine whether the activity indicated by a client is known, for example, execute a savings account transaction would give completeness and specificity would require information related to an attempt to perform a deposit, more particularly using an automated teller machine and the complete account number.

Certain activity categories may require definition of additional attributes. The information is then used as part of the follow on activity such as search or workflow process like opening a bank account. For example, in an example using a technical support domain, there are two sub-categories of activities comprising simple activities (for example, navigating) and complex activities (for example, upgrading). Complex activities have additional phases involved, and therefore the user needs to identify this requirement of additional phases as an additional attribute. For example, when a user is performing a software installation involving a set of steps knowledge of which step in the process the user is current at such as planning, preparing, building and testing is required for a complex activity to be deemed to well defined (for example, complete).

In an example using an insurance domain an insurance company in a claim activity phase including filing, inquiring, and conducting. Filing and inquiring steps are complex activities, whereas a conducting step is a simple activity such as an outstanding balance inquiry. In the example, filing requires the user to identify an additional attribute to gain a precise understanding of the type of filing involved, such as whether the type involves processing of special or one-time assessments, check processing, litigation tracking, or financial accounting.

Pillar 412 expresses a product and associated environment to identify the main product(s) of concern. Descriptor 414 for the product pillar of pillar 412 describes products within a domain of interest, to which an action (activity of pillar 408) can be applied. As a required source of information, query logic behavior 404 also strives for completeness in this pillar. The information is then used as part of the search or other follow on activities.

Products are grouped into categories, with an ensuing structure such as hierarchical. Additional qualifying information, including an environment related to a product or specificity may be required for some categories. For example, in an example using the technical support domain, achieving completeness typically requires in a first case a software product, related version, and associated operating system and version (environment), in a second case a hardware product and in a third case an operating system version.

Using an insurance domain, the following product categories and qualifiers are examples in a first instance policies, policy types, and associated environment (policy environment consists of policy group, division, and existing risk portfolio) and in a second instance claims, claim types, and respective financial details.

Pillar 416 expresses the situation to identify symptoms associated with a specific situation or incident. Descriptor 418 for the situation pillar of pillar 416 describes the symptoms leading to the problem reported by the user. There is typically a structure such as a hierarchy involved using a type of situation. As a required source of information needed to understand a precise nature of a problem, query logic behavior 404 strives for completeness in this pillar. The information is then used as part of the search or other follow on processes.

Some situations may have required qualifying information. For example, using the technical support domain, a user may receive an error message, which can be used to describe the situation. Qualifying information, for example, includes an error message identifier, which would be useful in conducting a further inquiry. Using an insurance domain as an example, a situation may be defined as an event such as the death of a family member. Qualifying information for the situation includes a cause of death (natural, or otherwise) and attributes of the person such as age and health status.

Pillar 420 expresses a component to define where the situation identified in pillar 416 occurs; for example, the situation is related to a specific component. Descriptor 422 for the component pillar of pillar 420 describes components within a domain of interest, related to where a situation may have occurred or occurs. In some cases the component may be an additional piece of information that will be helpful for a search, but is not always required when all other pillars are present. There is a hierarchy involved with components in the ontology.

Using a technical support domain example a component would be hard drive, whereas using an example of the insurance domain a respective component would be beneficiary or dependant.

Supporting ontology concepts 424 are supporting concepts detected in the statements provided by the user as source data, and processed (either kept or discarded) to assist in a search strategy or other follow on activities.

Detect power action words 426 identifies words associated with or used to describe an action. Descriptor 428 further defines power action words as action words, but the words are not considered activities since the words do not directly contribute to a change, issue, or situation of the user or the words are too vague. However, these words are identified and annotated and retained, because these words play a role in understanding the context of the problem of the user.

An example from a technical support domain is a word automate, whereas an example from an insurance domain may be a word request.

Detect trash action words 426 identifies words that are also action words. Descriptor 428 further identifies trash action words as unwanted tokens that are typically discarded (not used, unless a user specifically selects the words to be carried forward). The trash action words are considered more general terms which will not play a role in better understanding the context of the problem of the user. An example from either a technical support domain or an insurance domain is the word feel.

Detect domain terms 434 identifies words that are nouns defining a particular domain. Descriptor 436 describes domain terms as important nouns, which define a particular domain, and therefore give details about the context of the problem of the user. The domain terms are kept for the follow on process purposes. An example from a technical support domain is Internet protocol, whereas an example from an insurance domain may be health records.

Detect states 438 identifies words used as modifiers for domain terms, components, products and situations. Descriptor 440 describes states as modifiers providing additional information about domain terms, components, products and situations. States are usually adjectives. A number of proximity rules are applicable to states used to identify a concept to which the identified state is related. States are typically part of an antonym pair. An example using a technical support domain is offline/online (states), as a modifier applied to the component system. An example from an insurance domain is good/poor (states), as a modifier applied to the domain term of health.

Detect trash situation words 442 identifies generic situation words. Descriptor 444 describes trash situation words as generic situation words which are identified as unwanted tokens and typically discarded (not used in follow on activities, unless a user specifically selects the word). Trash situation words are considered more general terms which will not play a role in better understanding of the context of the user problem. When trash situation words are identified a user will then be asked to enter a respective specific situation, to achieve completeness in the situation of pillar 416. Examples of trash situation words applicable to either previous example domains are problem and issue.

Remaining useful words 446 are important standard words, which are specific to a domain. Descriptor 448 describes identified remaining useful words as important standard words specific to a domain, and may therefore provide additional context with respect to the user problem. Remaining useful words as implied by the name are kept for search purposes. An example from a technical support domain is high capacity, whereas an example from an insurance domain is old.

Advanced concept details 450 are attributes of concepts that can be used in concept identification and definition. Acronyms 452 include elements such as product, feature, or service acronyms. Descriptor 454 describes when possible acronyms are identified in the input source data 302 of FIG. 3 the system confirms with the user to identify a correct associated concept, that is the correct acronym resolution. For example, when an acronym of TV is encountered during semantic analysis the user may be prompted to select an appropriate concept from among concepts of television and Tennessee Valley for the acronym. The acronym is then replaced by the selected concept and further refined for additional specificity when necessary.

Synonyms 456 are also attributes of concepts that can be used in concept identification and definition. Descriptor 458 describes when possible synonyms are identified in the source data and confirmation with the user when necessary is sought. The synonym is then replaced by the identified concept and specified further when necessary, although the original synonym could be used while interacting with the user for continuity purposes.

In the examples of FIG. 5 and FIG. 6 the following annotation identifiers in Table 1 may be used individually or in combinations:

TABLE 1

Annotation Identifiers

| Term | Usage |
|---|---|
| acr | acronym |
| act | activities (pillar) |
| con | connector word or phrase |
| comp | component (pillar) |
| dt | domain term |
| sit | situation (pillar) |
| st | state |
| sew | standard English word |
| paw | power action word |
| prod | product (pillar) |
| phrase | phrase |
| prox | proximity implication |
| syn | synonym |
| partial | partial |
| neg | negation |
| ruw | remaining useful word |
| taw | trash action word |
| tsw | trash situation word |

With reference to FIG. 5 a textual representation of an annotation using the system of FIG. 3 operable for various embodiments of the disclosure is presented. Sample 500 is an example of processing a user statement using semantic analyzer 304 with ontology 306 and annotator 308 of annotation system 300 of FIG. 3.

Sample 500 presents a result of processing a user statement submitted using a Web site. The user statement provided is as follows: We've been paying our premiums every month and pretty much every single claim gets denied (emergency room visit due to asthma—they paid nothing. Cancer surgery—they paid nothing). Why am I paying them every month since they don't seem to cover anything?

Using the processing capabilities of annotation system 300 of FIG. 3 the user statement is processed through a set of operations including assessing, annotating, phrasing, and aligning to achieve the result of sample 500. In the example of sample 500, an annotation system performing semantic analysis using a set of operations was used to process source data statements received from a user. Each word or phrase identified in the source data statement 302 of FIG. 3 is processed as a semantic analyzer traverses the statement. Logic behavior is controlled by the data being analyzed in that certain types of concepts, identified words or phrases direct or trigger additional processing when required as indicated for an identified respective type of concept (previously described in table 400 of FIG. 4).

Each operation in the set of operations is not necessarily performed on each word or phrase identified at all times. Rather a minimal set of operation is performed to accomplish the task of a complete analysis of the statements in the source data. Although presented as a set of operations without an explicit sequence, a minimal order is implied, with initial word and phrase identification. Additional operations are performed as needed according to the data analyzed and intermediate results obtained.

Preferably, every word and corresponding relationship to the problem domain is identified in which every phrase and not just each word as a stand-alone element is assessed. Analysis further reviews and identifies negation of a word or phrase, partial matching of words in phrase and use of synonyms and acronyms. Additionally the semantic analysis process intelligently interprets a state of a word/phrase in a statement and the antonym of that state.

The semantic analysis also identifies connector words and phrases including throw away words and phrases referred to as standard words. Additionally words and phrases in the source data statements that are too vague to be actionable are identified and referenced as power action words.

Domain relevant terms that match critical user words and phrase are identified in the input source data statements. Proximity implications of word and phrases to other words and phrases are considered and identified during processing. Remaining useful words that should be kept as part of the received user statement are identified.

The semantic analysis may also define and manage the order of the words and phrase to optimize a particular usage requirement. Other operations can be added to augment examples provided to meet the particular needs of an installation or a particular domain.

As a result of completion of a semantic analysis operation on a specific word or phrase in the source data an annotation is identified representative of a match of the specific word or phrase in the source data with a corresponding classification in the selected ontology. One form of result is provided in the examples of sample 500 and sample 600 of FIG. 6.

In the example results a portion of each text stream of source data statements is aligned with a corresponding set of annotations for each respective element of a source data statement. In an alternative result predetermined delimiters may separate the elements of the source data statement and the respective associated annotations may also be separated by the same set of predetermined delimiters or a different set of delimiters.

In another alternative representation each respective element of a source data statement may be replaced by a token. In this alternative the respective associated annotations may follow an associated token, or as before may be provided as a separate set of annotations. Using previously described examples enables the annotations derived from sematic analysis to be logically or physically associated with the elements of the source data statements to which they apply.

In sample 500 three statements comprising statement 502, 506, 510 and 514 from a user are processed using semantic analysis of annotation system 300 of FIG. 3. For example a first portion of a first statement, statement 502 contains We've been paying our premiums every month and pretty much every single claim and is associated with a parallel set of annotations 504 comprising con con act con dt st dt con sew sew st dt prod (described below). Using statement 502 and annotations 504, example 518 has a first word we've with a corresponding annotation value assigned of con (a connector). In example 520, the word premiums in statement 502 has a corresponding annotation value assigned of dt (a domain element) in annotations 504. In this example the output presentation is shown with corresponding elements aligned, however this view may be changed as needed.

In a similar manner portions represented as statement 506, 510 and 514 correspond with annotations 508, 512 and 516 respectively. The example portrays a parallel representation of source statement portion with corresponding annotations, however other presentation forms can be used including comma separated values, positional identifiers, source element and annotation value pairs as form of intermediate out of an embodiment of the annotation system required by a receiving subsequent process.

With reference to FIG. 6 a textual representation of an annotation using the system of FIG. 3 operable for various embodiments of the disclosure is presented. Sample 600 is an example of processing a user statement using semantic analyzer 304 with ontology 306 and annotator 308 of annotation system 300 of FIG. 3.

The same set of semantic analysis operations available in processing of sample 500 of FIG. 5 are available in processing of sample 600. In this example a set of six source data statements are provided by a user as follows: My husband purchased a life insurance policy from XYZ Life Insurance Co. He passed away on Sep. 6, 2009. A claim was filed on Sep. 12, 2009. XYZ Life sent me a letter stating that since the policy was less than 2 years old, they were conducting a "routine inquiry", requesting hospital and doctor's records. I think they feel he wasn't in good health when the policy was purchased. I feel that XYZ Life is stalling, looking for a reason not to pay this claim.

The set of six source data statements is represented as streams of words in statements 602, 606, 610, 614, 618, and 622. A corresponding set of annotations for each of the source data statements is presented as annotations 604, 608, 612, 616, 620, and 624 respectively. In sample 600 instances of multiple annotations per word or phrase are identified. In example 626 the phrase life insurance policy has corresponding annotation values of prod/phrase indicating a domain element with associated words forming a phrase. Example 630 depicts a similar example using a domain term in phrase. In example 626 the acronym XYZ portion of the name of the insurance company has corresponding values of dt/acr indicating a domain element in the form of an acronym.

Example 632 depicts another occurrence of multiple annotations of dt/syn/partial indicating use of a domain term that is a synonym of a term and is only partially represented in the source statement. This example would typically require confirmation with a user or additional processing for completeness.

Example 634 depicts an occurrence of multiple annotations of dt/prox indicating use of a domain term in proximity with another word or term, which should remain together for subsequent processing. In this case the example deals with a possessive term of the doctor's records.

Figure 7:
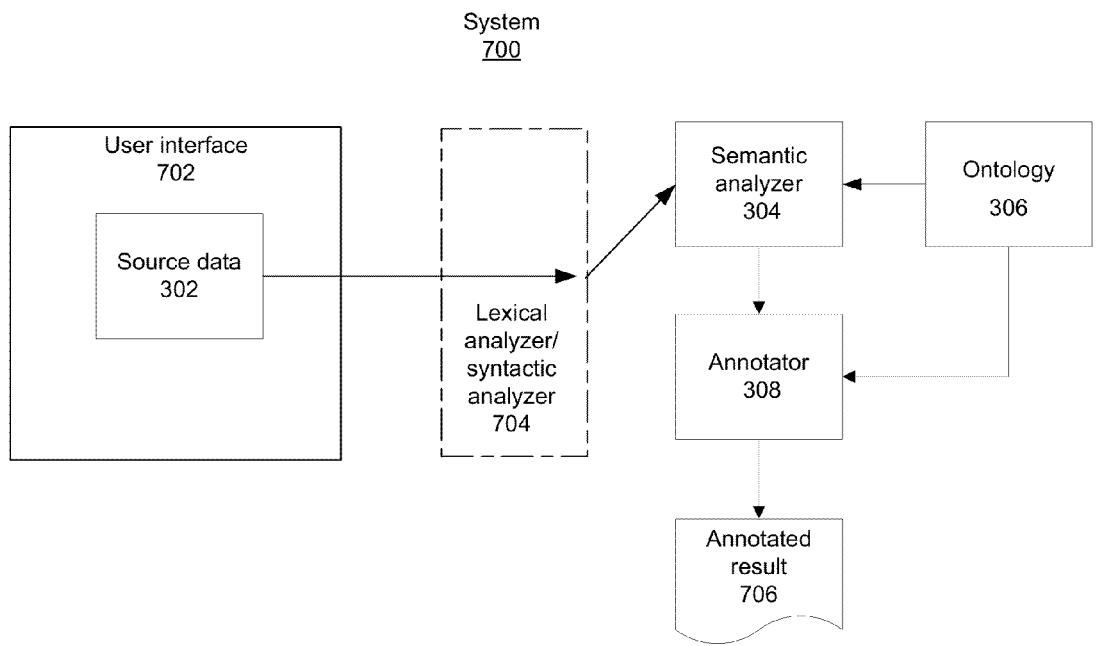
FIG. 7 is a block diagram of a logical view of processing using the annotation system of FIG. 3 in accordance with one embodiment of the disclosure.

With reference to FIG. 7 a block diagram of logical view of processing using the annotation system of FIG. 3 in accordance with one embodiment of the disclosure is presented. System 700 is an overview example of an embodiment of the annotation system of FIG. 3.

Typical input to the system is provided through user interface 702 as source data 302 of FIG. 3. The source data optionally flows through lexical analyzer/syntactic analyzer 704 when well-formed sentence structure is required. Lexical analyzer/syntactic analyzer 704 provides a capability of identifying errors in form and structure of the user statements presented in source data 302 of FIG. 3 and accordingly preventing such errors from affecting downstream processing.

Semantic analyzer 304 of FIG. 3 receives the source data and processes the data in accordance with content of a selected ontology 306 of FIG. 3 to produce a semantic attribution of the inbound request. The selected ontology is prepopulated with content specific to a domain of interest upon which semantic analysis depends. The source data provided may include an explicit or implicit request for a specific domain or a user may request the domain separately. Semantic analyzer 304 of FIG. 3 traverses the elements of the source data from beginning to end iterating through a set of respective operations according to data comprising the elements of the source data and operational results using the contextual relationships of ontology 306 of FIG. 3, such as completeness and specificity as described in table 400 of FIG. 4.

For each term processed during semantic analysis a corresponding annotation value is determined and passed to annotator 308 of FIG. 3. Annotation values may comprise one or more values as extended attributes in the form of metadata for a respective word or phrase. The annotator forms annotated result 706 which may, in one embodiment, comprise a stream representative of the source data and a corresponding stream representative of the corresponding annotations for respective portions of the source data.

Figure 8:
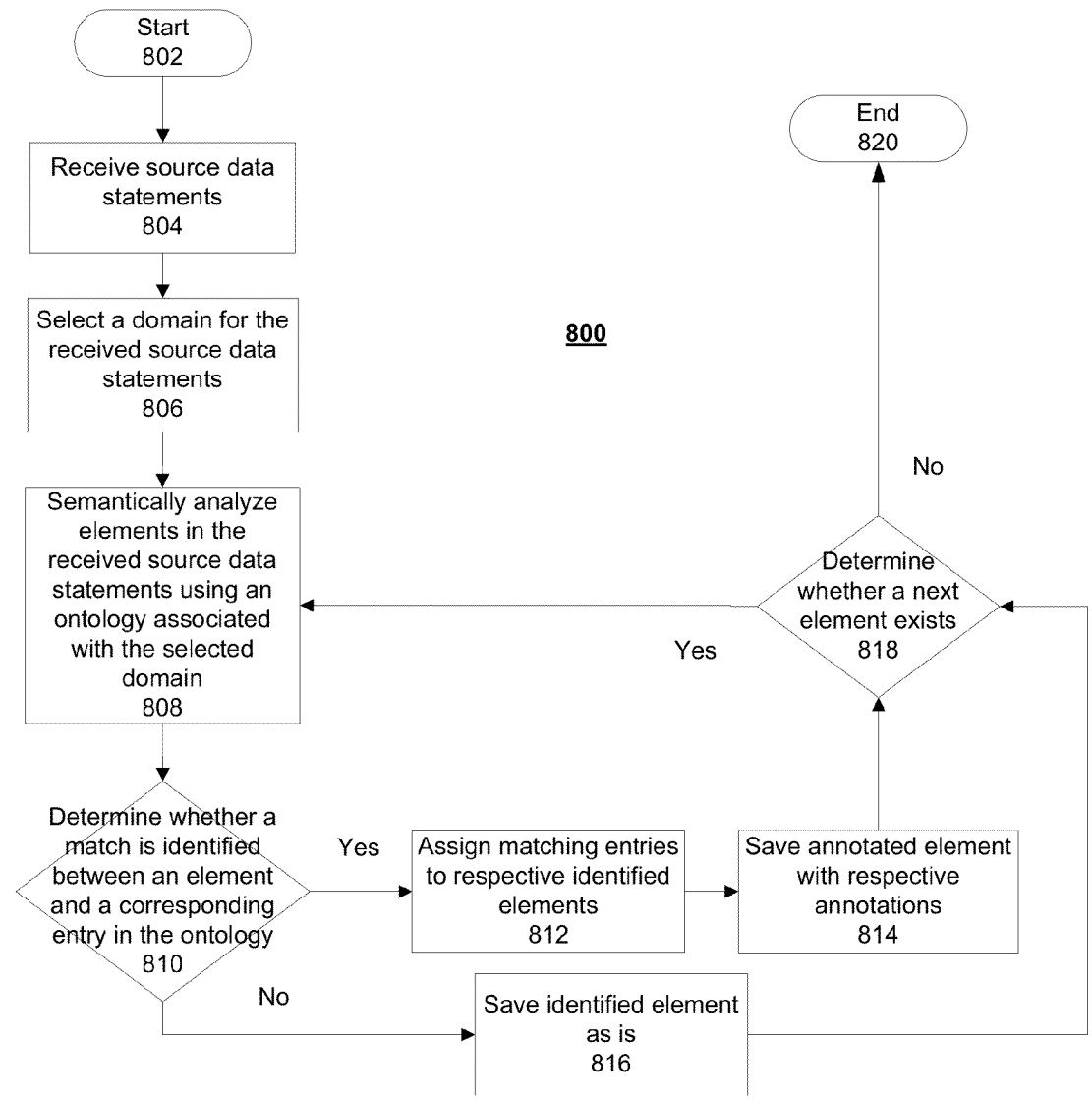
FIG. 8 is a flowchart of a process of the annotation system of FIG. 3 in accordance with one embodiment of the disclosure.

With reference to FIG. 8 a flowchart of a process of the annotation system of FIG. 3 in accordance with one embodiment of the disclosure is presented. Process 800 is an example embodiment of a process using annotation system 300 of FIG. 3.

Process 800 begins (step 802) and receives source data statements (step 804). The received source data statements are typically received from a user in a set of statements wherein the set comprises one or more statements. The user may or may not be a human user providing the statements through a user interface of a supporting data processing system. In alternative embodiment, received source data statements may be provided by storage devices 216 of data processing system 200 of FIG. 2.

Process 800 selects a domain for the received source data statements (step 806). The domain may have been indicated implicitly or explicitly in the received source data statements or in a separate request or message associated with the received source data statements. Selection of the domain associates an ontology used for processing the received source data statements. The ontologies used in the process are organized by domain for efficient processing of received source data statements.

Process 800 semantically analyzes elements in the received source data statements using an ontology associated with the selected domain (step 808). Semantic analysis of received source data statements provides a result of semantic attribution of inbound requests suitable for use by other downstream processes.

Process 800 determines whether a match is identified between an element and a corresponding entry in the ontology (step 810). Responsive to a determination that no match is identified between an element and a corresponding entry in the ontology, process 800 saves the identified element as is step 816. When annotation cannot be performed for words or phrases the respective words or phrases are simply maintained as is for use in a follow on process (external to process 800) for further resolution.

Responsive to a determination that a match is identified between an element and a corresponding entry in the ontology, process 800 assigns matching entries to respective identified elements (step 812). The matching entries comprise one or more attributions representative of extended attributes as metadata associated with the identified elements. As a result annotated elements are formed.

Process 800 saves the annotated elements with respective annotations (step 814). Process 800 determines whether a next element exists (step 818). Responsive to a determination a next element exists, process 800 loops back to perform step 808 as before. As long as an element remains the remaining element is processed. In certain cases an element receives multiple annotations using a set of operations performed in the single process. Input is provided to process 800 and output is either a single annotation or multiple annotations associated with the element of the input. Process 800 traverses the input stream in an iterative manner of operations as dictated by the element being processed. Responsive to a determination that a next element does not exist, there are no more elements and process 800 accordingly terminates (step 820).

Figure 9:
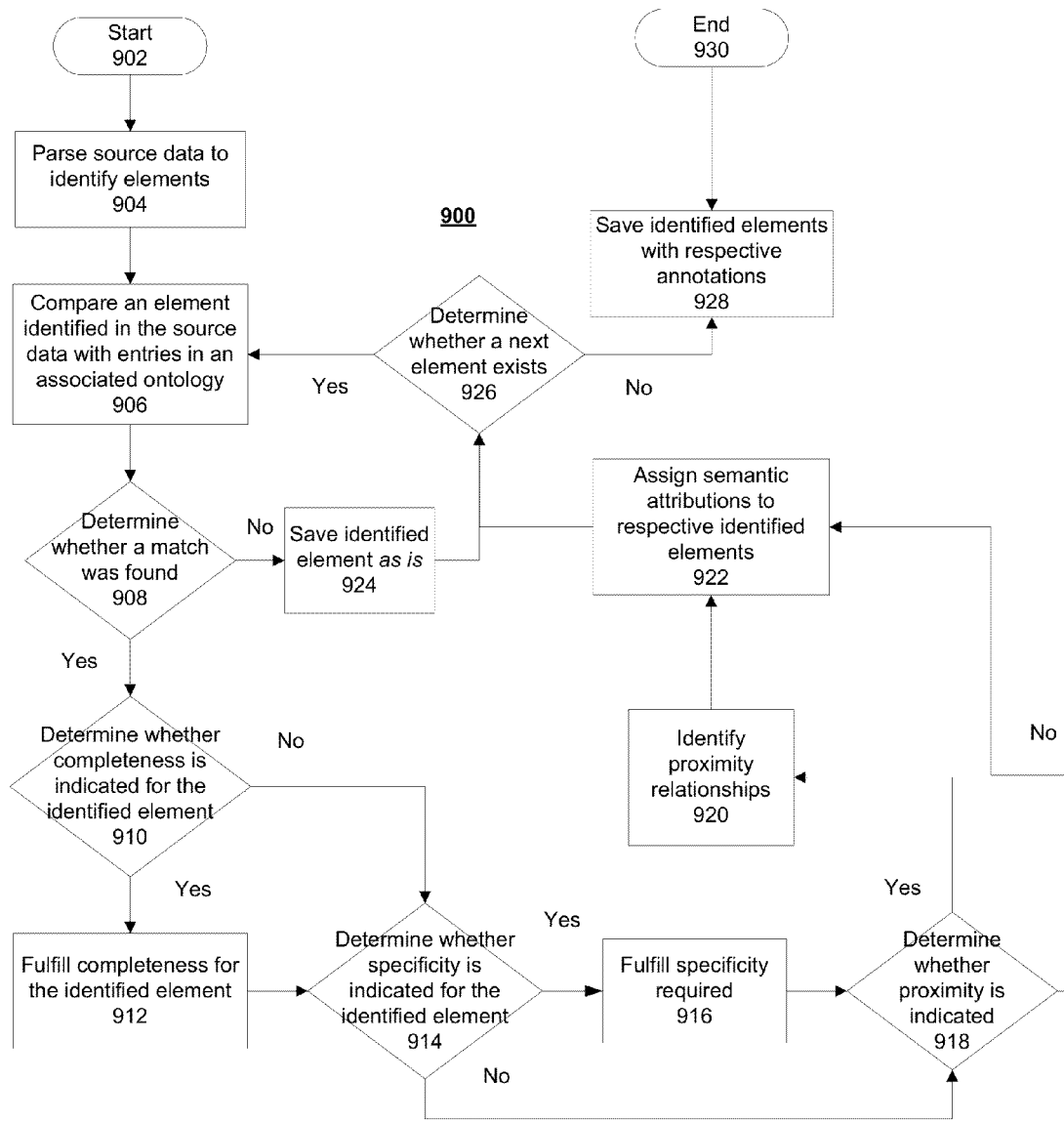
FIG. 9 is a flowchart of the semantic analysis process of FIG. 8 in accordance with one embodiment of the disclosure.

With reference to FIG. 9 a flowchart of the semantic analysis process of FIG. 8 in accordance with one embodiment of the disclosure is presented. Process 900 is an example embodiment of a detailed process of semantic analysis using annotation system 300 of FIG. 3.

Process 900 begins (step 902) and parses source data to identify elements (step 904). The elements are words and phrase comprising the source data statements received from a user, wherein the user is a human user of a computing device or application.

Process 900 compares an element identified in the source data with entries in an associated ontology (step 906). A comparison is made between an identified element and corresponding entries in a pre-populated ontology associated with a previously selected or specified domain. Process 900 determines whether a match was found (step 908).

Responsive to a determination that a match was not found, process 900 saves the identified element as is (step 924). Each element is therefore processed whether a match is identified without loss of an element from the input data. Process 900 determines whether a next element exists (step 926). Responsive to a determination a next element exists, process 900 loops back to perform step 906 as before. Responsive to a determination a next element does not exist, process 900 saves identified elements and respective annotations (step 928) and terminates thereafter (step 930). The saved identified elements and respective annotations, which may include elements without annotations, are accordingly available for subsequent processing by downstream processes (external to process 900) such as a query refinement process.

Responsive to a determination that a match was found, process 900 determines whether completeness is indicated for the identified element (step 910). Responsive to a determination that completeness is not indicated for the identified element, process 900 skips to step 914.

Responsive to a determination that completeness is indicated for the identified element, process 900 fulfills completeness for the identified element (step 912). For example, completeness may require requesting or obtaining additional qualifying information associated with the element, such as an activity. Some activity categories require the definition of additional attributes. The additional information may then be used as a part of search criteria.

Process 900 determines whether specificity is indicated for the identified element (step 914). Responsive to a determination that specificity is not indicated for the identified element, process 900 skips ahead to perform step 918. Responsive to a determination that specificity is indicated for the identified element, process 900 fulfills specificity required (step 916). For example, when using a banking system, specificity may require information identifying an activity relates to performing a deposit at an automated teller machine rather than a human teller.

Process 900 determines whether proximity is indicated for the identified element (step 918). Responsive to a determination that proximity is not indicated for the identified element, process 900 skips ahead to perform step 922. Responsive to a determination that proximity is indicated for the identified element, process 900 identifies proximity relationships (step 920). For example, a number of proximity conditions may apply to a word or term identified in the source data statement to help identify a concept to which the word or term is related, such as the example of doctor's records in sample 600 of FIG. 6.

Process 900 assigns semantic attributions to respective identified elements (step 922). Semantic attributions comprise extended attributes obtained through processing of the associated ontology. The extended attributes comprise one or more attributes representing metadata of the respective identified elements in the source data statements. Process 900 performs step 926 as before.

Thus is presented in an illustrative embodiment a computer-implemented process for semantic attribution of an inbound request. The computer-implemented process receives source data statements, selects a domain for the received source data statements and semantically analyzes elements in the received source data statements using an ontology associated with the selected domain. The computer-implemented process further determines whether a match is identified between an element and a corresponding entry in the ontology and responsive to a determination that the match is identified between the element and the corresponding entry in the ontology, assigns matching entries to respective identified elements to form annotated elements and saves the annotated elements with respective annotations.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for semantic attribution of a request, said method implemented by a processor of a computer system, said method comprising:
    said processor receiving source data statements for the request;
    said processor receiving a selection of a domain for the received source data statements;
    said processor semantically analyzing the received source data statements, said semantically analyzing comprising matching elements in the received source data statements to respective one or more entries in an ontology associated with the selected domain, wherein the ontology comprises items and relationships that define the selected domain, and wherein each element in the received source data statements is a word or a phrase;
    said processor assigning the one or more entries to the matched elements, respectively, to annotate each matched element with a respective annotation consisting of the respective one or more entries, wherein the annotation that annotates one matched element of the matched elements is a domain term that expresses that the one matched element is a noun defining a particular domain;
    said processor saving the annotated elements with the respective annotations; and
    said processor using the annotations to generate a search query for the request.

2. The method of claim 1, wherein the method further comprises:
    after said matching is performed for one matched element of the matched elements, said processor determining that at least one condition is indicated for the one matched element;
    responsive to determining that at least one condition is indicated for the one matched element, said processor fulfilling each condition of the at least one condition for the one matched element,
    wherein the at least one condition is selected from the group consisting of specificity, proximity, both specificity and proximity, both specificity and completeness, and both proximity and completeness,
    wherein fulfilling specificity for the one matched element comprises identifying an activity associated with the at least one matched element,
    wherein fulfilling completeness for the one matched element comprises obtaining additional information associated with the at least one matched element, and
    wherein fulfilling proximity for the one matched element comprises identifying proximity relationships for the one matched element.

3. The method of claim 2, wherein the at least one condition consists of specificity.

4. The method of claim 2, wherein the at least one condition consists of proximity.

5. The method of claim 2, wherein the at least one condition consists of both specificity and proximity.

6. The method of claim 2, wherein the at least one condition consists of specificity and completeness.

7. The method of claim 2, wherein the at least one condition consists of both proximity and completeness.

8. The method of claim 1, wherein said semantically analyzing comprises:
performing a lexical analysis of the source data statements to determine whether form and structure errors exist in the source data statements.

9. The method of claim 1, wherein the one or more entries of the annotation that annotates one matched element of the matched elements consists of a plurality of entries.

10. The method of claim 1, wherein the annotation that annotates one matched element of the matched elements is a pillar which is a main structural element of the ontology, wherein the pillar expresses: an activity and refers to what changed, a product and an associated environment to identify main products of concern, a situation to identify symptoms associated with a specific situation or incident, or a component to define where a situation occurs.

11. The method of claim 1, wherein the annotation that annotates one matched element of the matched elements expresses a negation of the one matched element.

12. The method of claim 1, wherein the annotation that annotates one matched element of the matched elements expresses that the one matched element is a power action word that is too vague to be actionable.

13. The method of claim 1, wherein the annotation that annotates one matched element of the matched elements expresses that the one matched element is an acronym.

14. The method of claim 1, wherein the annotation that annotates one matched element of the matched elements expresses that the one matched element is a trash action word which is an action word that is an unwanted token to be discarded.

15. The method of claim 1, wherein the annotation that annotates one matched element of the matched elements expresses that the one matched element is a trash situation word which is a generic situation word that is an unwanted token to be discarded.

16. A computer program product, comprising a computer readable hardware storage device having a computer readable program code stored therein, said program code configured to be executed by a processor of a computer system to implement a method for semantic attribution of a request, said method comprising:
said processor receiving source data statements for the request;
said processor receiving a selection of a domain for the received source data statements;
said processor semantically analyzing the received source data statements, said semantically analyzing comprising matching elements in the received source data statements to respective one or more entries in an ontology associated with the selected domain, wherein the ontology comprises items and relationships that define the selected domain, and wherein each element in the received source data statements is a word or a phrase;
said processor assigning the one or more entries to the matched elements, respectively, to annotate each matched element with a respective annotation consisting of the respective one or more entries, wherein the annotation that annotates one matched element of the matched elements is a domain term that expresses that the one matched element is a noun defining a particular domain;
said processor saving the annotated elements with the respective annotations; and
said processor using the annotations to generate a search query for the request.

17. The computer program product of claim 16, wherein the method further comprises:
after said matching is performed for one matched element of the matched elements, said processor determining that at least one condition is indicated for the one matched element;
responsive to determining that at least one condition is indicated for the one matched element, said processor fulfilling each condition of the at least one condition for the one matched element,
wherein the at least one condition is selected from the group consisting of specificity, proximity, both specificity and proximity, both specificity and completeness, and both proximity and completeness,
wherein fulfilling specificity for the one matched element comprises identifying an activity associated with the at least one matched element,
wherein fulfilling completeness for the one matched element comprises obtaining additional information associated with the at least one matched element, and
wherein fulfilling proximity for the one matched element comprises identifying proximity relationships for the one matched element.

18. A computer system comprising a processor, a memory coupled to the processor, and a computer readable storage device coupled to the processor, said storage device containing program code configured to be executed by the processor via the memory to implement a method for semantic attribution of a request, said method comprising:
said processor receiving source data statements for the request;
said processor receiving a selection of a domain for the received source data statements;
said processor semantically analyzing the received source data statements, said semantically analyzing comprising matching elements in the received source data statements to respective one or more entries in an ontology associated with the selected domain, wherein the ontology comprises items and relationships that define the selected domain, and wherein each element in the received source data statements is a word or a phrase;
said processor assigning the one or more entries to the matched elements, respectively, to annotate each matched element with a respective annotation consisting of the respective one or more entries, wherein the annotation that annotates one matched element of the matched elements is a domain term that expresses that the one matched element is a noun defining a particular domain;
said processor saving the annotated elements with the respective annotations; and
said processor using the annotations to generate a search query for the request.

19. The computer system claim 18, wherein the method further comprises:
after said matching is performed for one matched element of the matched elements, said processor determining that at least one condition is indicated for the one matched element;
responsive to determining that at least one condition is indicated for the one matched element, said processor fulfilling each condition of the at least one condition for the one matched element,
wherein the at least one condition is selected from the group consisting of specificity, proximity, both specificity and proximity, both specificity and completeness, and both proximity and completeness,
wherein fulfilling specificity for the one matched element comprises identifying an activity associated with the at least one matched element,
wherein fulfilling completeness for the one matched element comprises obtaining additional information associated with the at least one matched element, and
wherein fulfilling proximity for the one matched element comprises identifying proximity relationships for the one matched element.

* * * * *